US011403739B2

(12) United States Patent
Chen et al.

(10) Patent No.: US 11,403,739 B2
(45) Date of Patent: Aug. 2, 2022

(54) METHODS AND APPARATUS FOR RETARGETING AND PRIORITIZED INTERPOLATION OF LENS PROFILES

(75) Inventors: Simon Chen, San Jose, CA (US); Eric Chan, Belmont, MA (US); Hailin Jin, San Jose, CA (US); Jen-Chan Chien, Saratoga, CA (US)

(73) Assignee: Adobe Inc., San Jose, CA (US)

( * ) Notice: Subject to any disclaimer, the term of this patent is extended or adjusted under 35 U.S.C. 154(b) by 1670 days.

(21) Appl. No.: 12/758,647

(22) Filed: Apr. 12, 2010

(65) Prior Publication Data

US 2013/0124159 A1    May 16, 2013

(51) Int. Cl.
*G06T 5/00* (2006.01)
*H04N 5/357* (2011.01)
*H04N 5/217* (2011.01)
*H04N 9/04* (2006.01)

(52) U.S. Cl.
CPC ............ *G06T 5/006* (2013.01); *H04N 5/217* (2013.01); *H04N 5/3572* (2013.01); *H04N 9/04515* (2018.08); *G06T 2207/10004* (2013.01)

(58) Field of Classification Search
CPC ......... G06F 17/5018; G03B 7/16; G03B 3/00; G06T 5/006; G06T 2207/10004; H04N 5/217
See application file for complete search history.

(56) References Cited

U.S. PATENT DOCUMENTS

| 5,891,314 | A  | * | 4/1999 | Heffelfinger et al. ........ 204/461 |
| 6,323,934 | B1 | * | 11/2001 | Enomoto ................ G06T 5/006 355/32 |
| 8,368,762 | B1 |   | 2/2013 | Chen et al. |
| 2002/0196472 | A1 | * | 12/2002 | Enomoto ..................... 358/3.26 |
| 2004/0066454 | A1 |   | 4/2004 | Otani et al. |
| 2004/0155970 | A1 |   | 8/2004 | Johannesson et al. |
| 2004/0252217 | A1 | * | 12/2004 | Battles ................... H04N 5/232 348/333.01 |
| 2006/0066841 | A1 | * | 3/2006 | Slonaker ............ G02B 27/0012 356/124 |

(Continued)

OTHER PUBLICATIONS

Pontinen, Study on Chromatic Aberration of Two Fisheye Lenses, Oct. 2005, Helsinki University of Technology, pp. 27-32.*

(Continued)

*Primary Examiner* — Boris Gorney
*Assistant Examiner* — Bernard E Cothran
(74) *Attorney, Agent, or Firm* — FIG. 1 Patents

(57) ABSTRACT

Methods and apparatus for retargeting and prioritized interpolation of lens profiles. A lens profile file may include a set of lens sub-profiles. The camera body and/or settings described in the file may not exactly match that of camera body and/or settings used to capture a target image. A sub-profile processing module may perform a prioritized sub-profile sorting and interpolation method to generate an interpolated sub-profile that may be applied to the target image to correct aberrations including, but not limited to, geometric distortion, lateral chromatic aberration, and vignette. Thus, models generated for a reference camera at a variety of settings may be applied to a target image captured with the same type of lens but with a different camera and/or with different settings that are not exactly modeled in the lens profile file.

20 Claims, 10 Drawing Sheets

(56) References Cited

U.S. PATENT DOCUMENTS

| | | | |
|---|---|---|---|
| 2007/0171282 A1* | 7/2007 | Yanagi | H04N 1/2112 348/207.99 |
| 2007/0171288 A1* | 7/2007 | Inoue et al. | 348/241 |
| 2008/0002961 A1* | 1/2008 | Sundstrom | 396/133 |
| 2008/0303922 A1* | 12/2008 | Chaudhri et al. | 348/231.99 |

OTHER PUBLICATIONS

Tommaselli et al., A Mathematical Model for Camera Calibration using Straight Lines, Jan. 2006, Department of Cartography, pp. 1-6.*

Azooptics, Geometrical Distortion, 2007, AZoOptics, pp. 1-5 (Year: 2007).*

Dictionary.Com, Focal Length, 2018, Dictionary.com, pp. 1-9 (Year: 2018).*

Mansurov, What is Vignetting?, 2018, Photography Life, pp. 1-10 (Year: 2018).*

Dan B Goldman, "Vignette and Exposure Calibration and Compensation". IEEE Transactions on Pattern Analysis and Machine Intelligence (PAMI), Feb. 25, 2010.

Goldman, D.B., Chen, J.H., 2005. "Vignette and Exposure Calibration and Compensation". IEEE Conference on Computer Vision (ICCV) '05, vol. 1.

Seon Joo Kim, Marc Pollefeys, "Robust Radiometric Calibration and Vignetting Correction". IEEE Transactions on Pattern Analysis and Machine Intelligence (PAMI), 30(4):562-576, 2008.

Zhang, Z., 1999. "Flexible Camera Calibration By Viewing a Plane From Unknown Orientations". IEEE Conference on Computer Vision (ICCV) '99.

R. Hartley. "Self-calibration from multiple views with a rotating camera". In Proc. 3rd European Conference on Computer Vision, pp. 471-478, Stockholm, Sweden, May 1994.

O. D. Faugeras, Q.-T Luong, and S. J. Maybank. "Camera self-calibration: Theory and experiments". In Computer Vision—ECCV '92, LNCS-Series vol. 588, Springer-Verlag, pp. 321-334, 1992.

Y. Y. Schechner and S. K. Nayar. "Generalized mosaicing: High dynamic range in a wide field of view". IJCV, 53(3):245-267, 2003.

J. Stumpfel, A. Jones, A. Wenger, and P. Debevec. "Direct HDR capture of the sun and sky". In Proc. AfriGraph, pp. 145-149, 2004.

A. Litvinov and Y. Y. Schechner. "Radiometric framework for image mosaicking". JOSA A, 22(5):839-848, 2005.

Lucchese, L. [Luca], "Geometric calibration of digital cameras through multi-view rectification". IVC(23), No. 5, May 1, 2005, pp. 517-539.

Joaquim Salvi, Xavier Armangu'e, Joan Batlle, "A comparative review of camera calibrating methods with accuracy evaluation". Pattern Recognition 35 (2002) 1617-1635.

U.S. Appl. No. 12/201,822, filed Aug. 29, 2008.

U.S. Appl. No. 12/201,824, filed Aug. 29, 2008.

"Non Final Office Action", U.S. Appl. No. 12/758,655, (dated May 15, 2012), 6 Pages.

"Notice of Allowance", U.S. Appl. No. 12/758,655, (dated Oct. 4, 2012), 4 pages.

"U.S. Application as Filed", U.S. Appl. No. 12/201,822, filed Aug. 29, 2008, 55 pages.

Hartley, Richard "Self-Calibration from Multiple Views with a Rotating Camera", *In Proc. 3rd European Conference on Computer Vision*, Stockholm, Sweden,(May 1994), 8 Pages.

* cited by examiner

METHODS AND APPARATUS FOR RETARGETING AND PRIORITIZED INTERPOLATION OF LENS PROFILES

BACKGROUND

Description of the Related Art

Cameras are light capturing devices. The light begins as rays emanating from some source, such as the sun, and travels through space until striking some object. When that light reaches the object, much spectrum of the light is absorbed, and what is not absorbed is reflected. Some of this reflected light makes its way through the optics of the camera and is collected by the camera sensor (or film) at the image plane. The geometric configuration of the passage of a bundle of light rays from the object through the lens(es) to the image plane can be described mathematically by a parametric model, which may be referred to as the camera model.

The pinhole camera model is a simplistic model in which the bundle of light rays would pass from the object to the image plane through a single perspective center to form a sharp image on the plane of focus according to the fundamental physical laws of the ray optics. In this ideal model, there is no distortion in the images. However, in real world cameras, the camera lens typically involves design compromises and imperfections that may introduce lens aberrations in the captured image. The pinhole camera model is only good as a first order approximation. Deviations from this ideal model (aberrations) may be considered and mathematically modeled. Camera calibration is the process of estimating the camera model parameters that best describe what happens to a bundle of rays coming from the object as they pass through the lens and onto the image plane. Lens aberrations may include, but are not limited to, geometric distortion, lateral chromatic aberration, and vignetting.

Most, if not all, captured images include at least some geometric distortion introduced primarily by the camera lens components. Geometric lens distortion may be classified into two primary types—radially symmetric distortion and tangential distortion. Radially symmetric distortion, or simply radial distortion, may be present in captured images, for example as a result of the optical characteristics of lenses in conventional (film) and digital cameras. FIGS. 1a and 1b illustrate examples of radial distortion. Radial distortion may be classified into two types: barrel distortion, as illustrated in FIG. 1a, and pincushion distortion, as illustrated in FIG. 1b. Barrel distortion is typically associated with wide-angle lenses, while pincushion distortion is typically associated with long-range or telescopic lenses. Tangential distortion may, for example, be present in a captured image as a result of imperfect alignment of lens elements or other manufacturing defects in a compound lens. Tangential distortion is sometimes referred to as decentering distortion. FIG. 2 illustrates an example of tangential distortion. Many if not most captures images will include at least some general geometric lens distortion consisting of both radial distortion and tangential lens distortion components. FIG. 3 illustrates an example of geometric lens distortion with both barrel distortion and tangential distortion components.

Lateral chromatic aberration is an optical aberration that gives the appearance of color fringing, particularly along high-contrast areas of the image. This aberration is caused by different wavelengths that make up white light being magnified at different positions of the same focal plane.

Vignette, or vignetting, refers to light falloff at the periphery of an image, giving the appearance of a darker border along the edges of the image.

Camera/Lens Parameters

Many digital cameras may store one or more camera/lens parameters including, but not limited to, the focal length, focus distance, aperture, and sensor format factor in metadata (e.g., EXIF data) of images captured with the camera. The focal length (F) of a camera/lens combination refers to the perpendicular distance from the perspective center of the lens system to the image plane, also known as the principal distance. The focus distance is the actual distance of the camera from the subject being photographed, and may also be referred to as the subject distance. The lens aperture, or simply aperture of a camera, refers to the adjustable opening in the iris diaphragm of a camera that determines the amount of light that will pass through the lens during exposure. Aperture is typically specified as an f/number (e.g., f/8, f/11). The smaller the f/number, the more light passes through. The sensor format factor of a digital camera refers to the dimension of the camera's sensor imaging area relative to the 35 mm film format. Specifically the sensor format factor is the ratio of a 35 mm frame's diagonal (43.3 mm) to the diagonal of the image sensor in question, i.e. $\text{diag}_{35mm}/\text{diag}_{sensor}$. The sensor format factor may also be referred to as the camera's crop factor, or the focal length multiplier.

SUMMARY

Various embodiments of methods and apparatus for retargeting and prioritized interpolation of lens profiles are described. Embodiments may provide a sub-profile processing module that implements the methods for retargeting and prioritized interpolation of lens profiles. A lens profile file may be a general container for a list of lens sub-profiles according to a camera model. Each sub-profile includes one or more descriptions of mathematical models for correcting aberrations (e.g., geometric distortion, lateral chromatic aberration, and vignette) in target images. The camera body and the camera settings described in a lens profile file may not exactly match that of camera body and the camera settings used to capture a target image. In addition, the camera settings that describe the target image shooting conditions may be absent from the target image's metadata (e.g., EXIF metadata). The methods for lens profile retargeting and interpolation that allow aberration correction models generated for one camera model (called the reference camera model) at a variety of camera settings to be applied to an image captured with the same type of lens, but with a possibly different camera model and/or with different camera settings that are not exactly modeled in the lens profile file.

Some embodiments of the sub-profile processing module may perform a prioritized sub-profile sorting and interpolation method to generate an interpolated sub-profile that includes one or more interpolated aberration correction models that may be applied to the target image to correct aberrations including, but not limited to, geometric distortion, lateral chromatic aberration, and vignette. The lens profile file may then be retargeted for a target image. Some embodiments of the sub-profile processing module may retarget the lens profile file for a target image, and then perform a prioritized sub-profile sorting and interpolation method to generate an interpolated sub-profile.

In some embodiments, retargeting a lens profile file for a target image may involve retargeting lens sub-profiles in the lens profile file for a different image orientation (portrait or landscape mode) if the target image was captured using a different orientation than was used to generate the lens sub-profile. The lens sub-profiles may be scaled to normalize the image resolution, if necessary. This may involve aligning the image centers and normalizing by the maximum of the image width and height in pixels. The lens sub-profiles may be scaled for a different camera sensor size, if the sensor size of the camera body with which the target image was captured is different than the sensor size used in estimating the models in the lens sub-profile. The sensor size of the camera body used to capture the target image may, for example, be computed from the sensor format (or crop) factor, which may be read from the metadata of the target image or may otherwise be obtained. Using embodiments, lens sub-profiles generated from or for a larger sensor can be applied to a target image captured with a camera with a smaller sensor and with the same type of lens. In some cases, lens sub-profiles generated from or for a smaller sensor can be applied to a target image captured with a camera with a larger sensor and with the same type of lens.

One or more of the camera settings (e.g., focal length, focus distance, and aperture) used to capture a target image may differ from the camera settings used to generate one or more, or all, of the sub-profiles in a lens profile file. Different camera settings (e.g., focal length, focus distance, and aperture) may have different levels of effect on a particular aberration. Thus, embodiments may provide a method for generating interpolated aberration models from the set of sub-profiles in a lens profile file that considers the priorities of camera settings. The set of interpolated aberration models so generated may be output as a lens sub-profile for the target image.

In some embodiments, a method for prioritized sub-profile sorting and interpolation may determine two sets of sub-profiles that bracket the target image according to a highest priority setting. Each set may include one or more sub-profiles. The method may determine two sub-profiles in each of the two sets that bracket the target image according to a second-highest priority setting. The method may interpolate the two bracketing sub-profiles in each of the two sets of sub-profiles to generate an interpolated profile according to the second-highest priority setting for each set. The method may interpolate the two sub-profiles from the two sets to generate an interpolated profile for the highest priority setting. The method may output the interpolated profile for the highest priority setting.

The above describes a method for prioritized sub-profile sorting and interpolation being performed for two prioritized camera settings (e.g., focal length and focus distance). However, the method can be extended to apply to three (e.g., focal length, focus distance, and aperture) or more prioritized camera settings. For example, for geometric distortion and lateral chromatic aberration model interpolation, the focal length may be the highest priority setting, and the focus distance may be the second highest priority setting. Aperture may be a non-factor; however, lens sub-profiles that are closest to the aperture of the target image may be selected from sets that bracket the target image according to focus distance, and interpolation applied to the models in the sub-profiles to generate a final, interpolated model. As another example, for vignette model interpolation, the focal length may be the highest priority setting, the aperture second highest priority setting, and the focus distance may be the third highest priority setting. For each prioritized setting, the sub-profiles may be sorted and bracketing sets or sub-profiles may be determined, and interpolation applied to the vignette models in the sub-profiles determined according to focus distance to generate a final, interpolated vignette model.

Figure 1A:
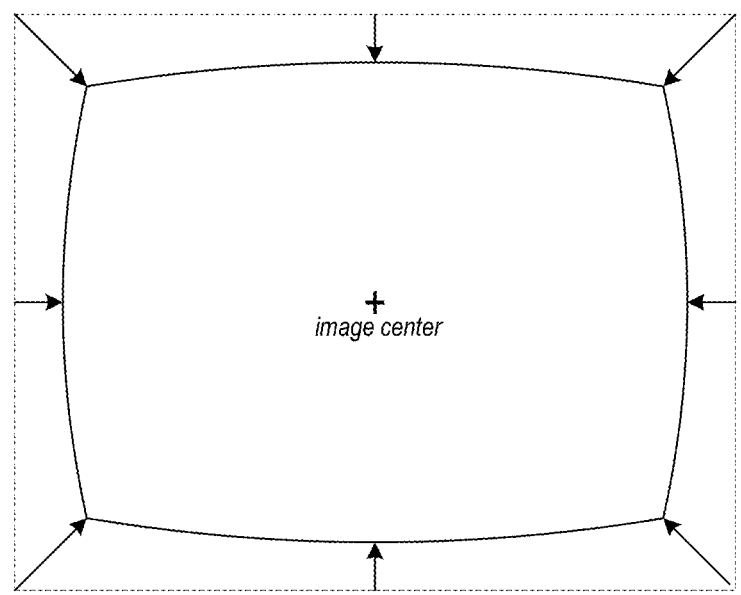
FIGS. 1A and 1B illustrate two types of radial distortion, barrel distortion and pincushion distortion, respectively.
Figure 1B:
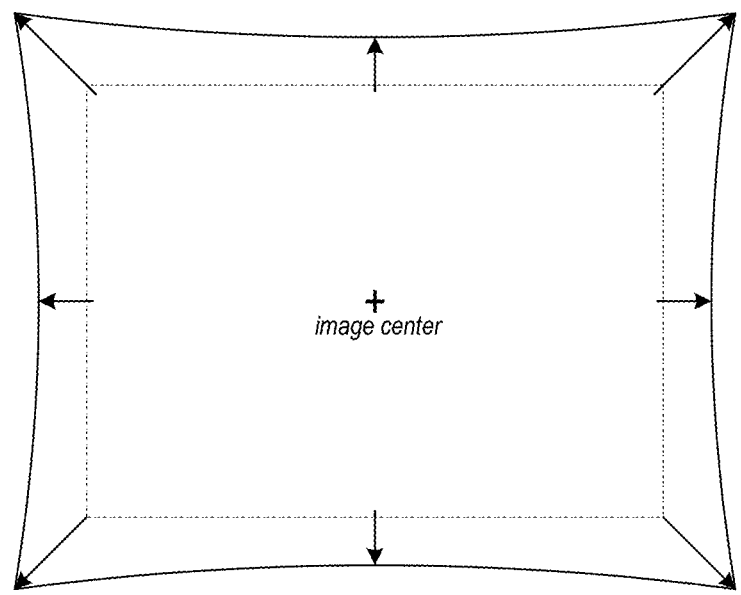
Figure 2:
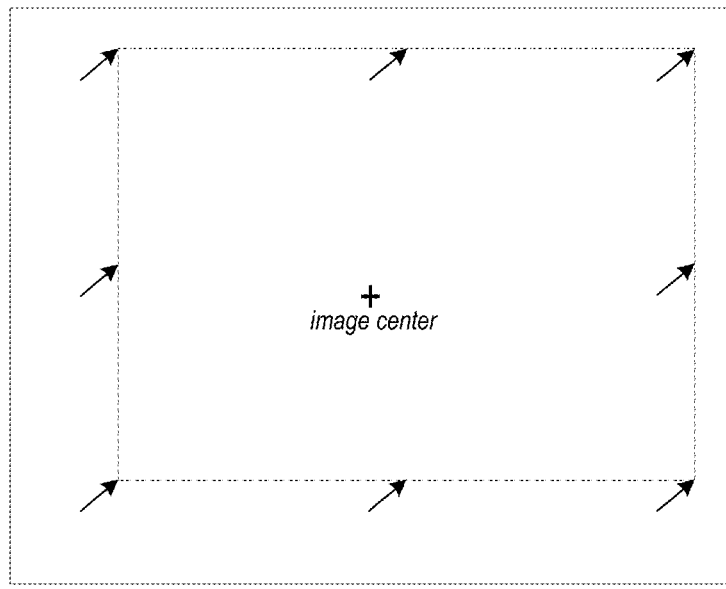
FIG. 2 illustrates tangential distortion.
Figure 3:
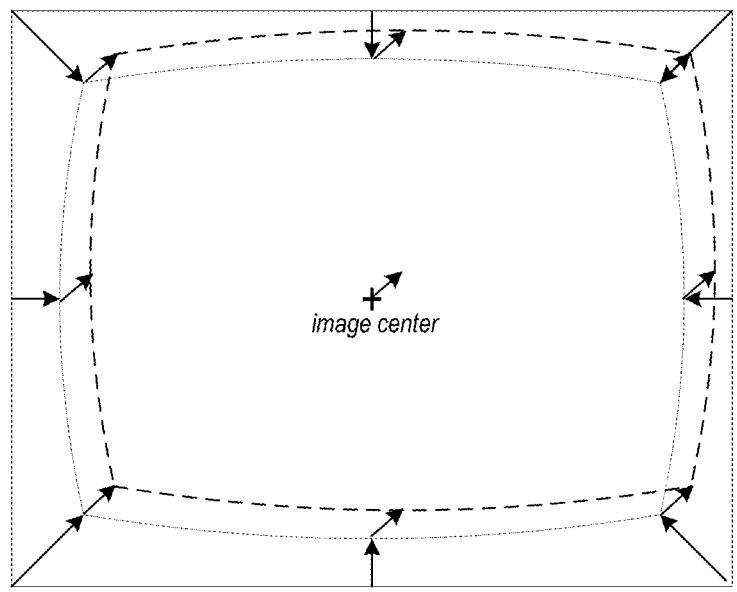
FIG. 3 illustrates an image with lens distortion including both radial and tangential distortion components.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for retargeting and prioritized interpolation of lens profiles are described. The types and the amount of lens distortion in a captured image are functions of the specific camera body, the lens, and the camera/lens settings (e.g., focal length, aperture, and focus distance) that are used capture the image. However, lens profiles that describe the camera model are typically generated from calibration chart images shot from a reference camera body with the same type of lens, typically sampled at a finite number of camera settings. In general, the camera body and the camera settings described in the lens profile may not exactly match that of camera body and the camera settings used to capture the target image. In addition, the camera settings that describe the target image shooting conditions may be absent from the target image's metadata (e.g., EXIF metadata). The methods for lens profile retargeting and interpolation described herein may allow lens profiles generated for one camera model (called the reference camera model) at a variety of camera settings to be applied to an image captured with the same type of lens, but with a possibly different (but compatible) camera model and with different camera settings that are not exactly modeled in the lens profile. In some embodiments, a different camera model may be compatible with a lens profile if the different camera model uses a photosensor that is the same size, or smaller than, the photosensor used in the camera model specified in the lens profile.

A lens profile file may include camera model description(s) for a specific camera body and lens combination. An example format for a lens profile file is provided later in this document in the section titled Example lens profile file format. An example camera model that may be used in some embodiments is provided later in this document in the section titled Example camera model. The lens profile file tells image processing applications, such as Adobe® Photoshop® or Adobe® Camera Raw®, how to apply lens correction on an input image. A lens profile file may be a general container for a list of lens sub-profiles. However, image processing applications may require that all sub-profiles in a lens profile file are for the same camera body and lens model combination. Furthermore, a lens profiling module that generates the lens profile file may ensure that all sub-profiles in a lens profile file are generated from the same type of source image file format (e.g., DNG, JPEG), color mode (RGB or grayscale), image pixel bit depths and camera model type (e.g., one of a rectilinear or fisheye lens model). Other camera settings such as focal length, aperture and focus distance may change from one sub-profile to another in a lens profile file. The additional file format constraints may be used in interpolation of the lens profile among the multiple sub-profiles within a lens profile file for new, unobserved camera settings, that is camera settings that are not exactly specified by a sub-profile in the lens profile file.

Figure 4:
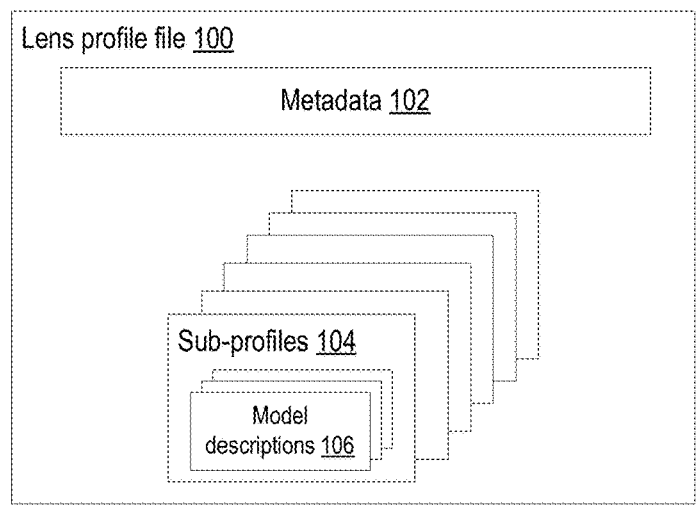
FIG. 4 is a block diagram that illustrates a lens profile file, according to some embodiments.

FIG. 4 is a block diagram that illustrates a lens profile file, according to some embodiments. A lens profile file 100 may contain one or more lens sub-profiles 104 for a specific camera body and lens combination. Each sub-profile 104 includes one or more descriptions 106 of mathematical models for correcting aberrations (e.g., geometric distortion, lateral chromatic aberration, and vignette) in target images. An example camera model that includes a geometric distortion model, a lateral chromatic aberration model, and a vignette model that may be used in some embodiments is provided later in this document in the section titled Example camera model. A lens profile file 100 may, for example, be read by an image processing application to determine a profile to be applied to correct aberrations in input images captured with the respective camera/lens combination. An example format for a lens profile file 100 is provided later in this document in the section titled Example lens profile file format.

Figure 5:
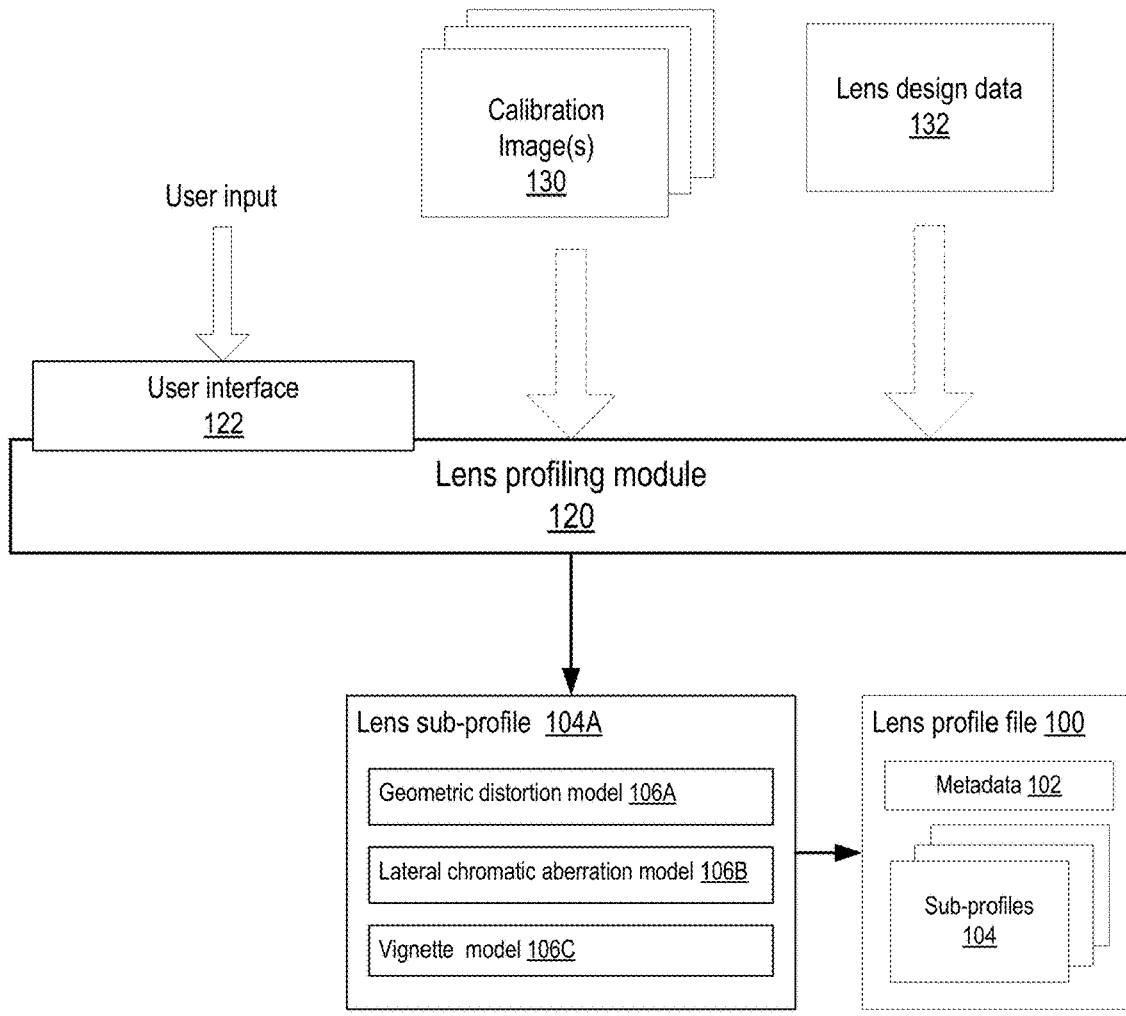
FIG. 5 illustrates operations of a lens profiling module, according to some embodiments.

The mathematical models 106 in a lens profile file may be estimated, for example, using a lens profiling module or tool. FIG. 5 illustrates operations of a lens profiling module, according to some embodiments. A lens profiling module 120 may be used to analyze data from calibration images 130 to generate customized lens sub-profiles 104 for correcting each of two or more aberrations, for example geometric distortion 106A, chromatic aberration 106B, and vignette 106C, for camera/lens combinations. However, it is to be noted that lens sub-profiles may be generated by other methods than analyzing data from calibration images 130. For example, as shown in FIG. 5, some embodiments of a lens profiling model 120 may be implemented to convert lens design data 132, for example CAD lens design data or one of a kind lens design data interchange format, directly to the lens sub-profiles without requiring capturing and processing calibration images 130. Some embodiments of a lens profiling module 120 may be implemented, for example, as a plug-in for or module in an image processing application, such as Adobe® Photoshop® or Adobe® Camera Raw®. Other embodiments may be otherwise implemented, for example as a stand-alone program or utility, or as a library function. A lens profiling module 120 may provide a user interface 122 via which the user may, for example, provide calibration images 130 or lens design data 132 to the lens profiling module 120 and/or perform other operations that require user input (e.g., setting parameters, specifying output lens profile files 100, etc.).

Figure 14:
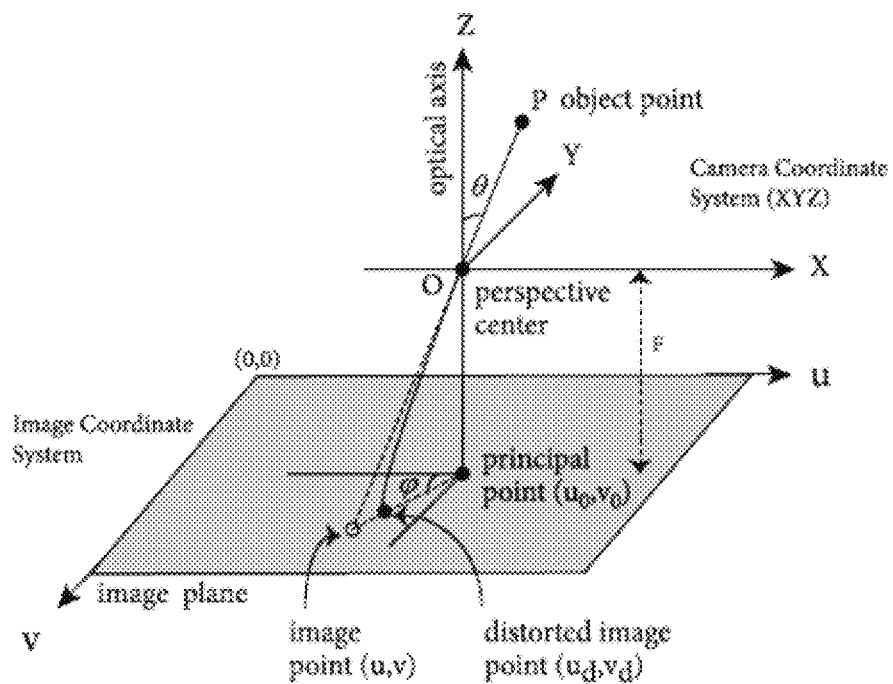
FIG. 14 illustrates an example camera model for a fisheye lens.

In some embodiments, each lens profile file 100 may be specific to a camera body and lens combination. As illustrated in FIGS. 4 and 5, the lens profile file 100 may include metadata 102 specifying one or more camera/lens parameters or properties. FIG. 14 shows an example set of metadata descriptors that may be included in a lens profile file 100. Some or all of these properties may be populated by a lens profiling module 120 when creating the lens profile file 100, for example from the metadata (e.g., EXIF/XMP metadata) of a calibration image 130.

While each lens profile file 100 may be specific to a camera body and lens combination, a lens profile file 100 may include multiple lens sub-profiles 104 for different settings of the camera/lens combination. For example, the focal length, focus distance, and aperture of a camera/lens combination may be changed when capturing images. A photographer may desire to profile the camera/lens combination at multiple settings of one or all of these camera/lens parameters. A lens profiling module 100 may allow the user to provide calibration images 130 captured at multiple settings of the camera/lens combination, generate a profile for each combination of settings, and append the profile to the lens profile file 100 as a sub-profile 104. Each sub-profile 104 may be tagged with one or more of the camera parameters used to capture the respective calibration image(s) 130 used to generate the sub-profile 104.

Figure 6:
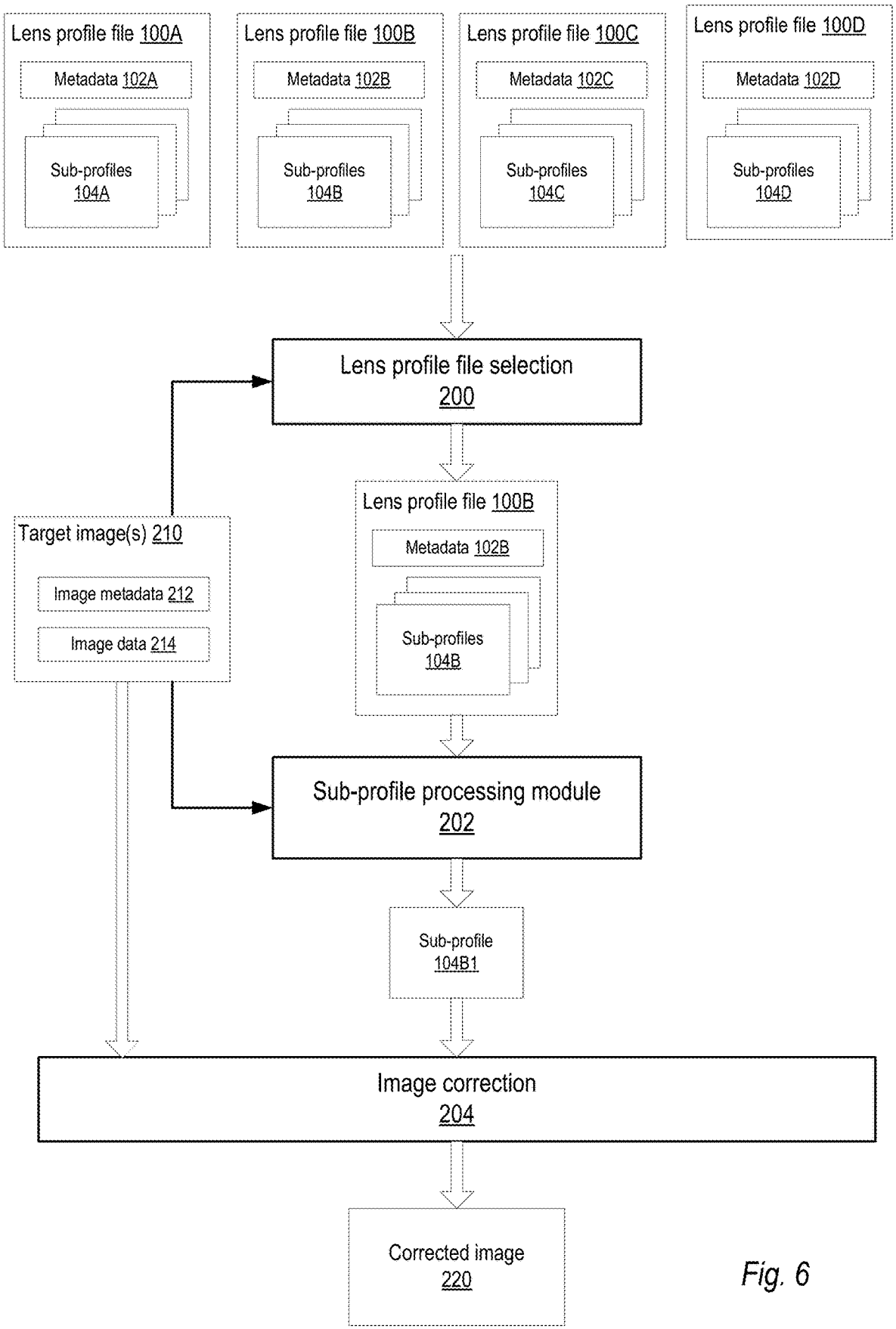
FIG. 6 is a block diagram illustrating a process of selection or generation of a lens sub-profile for correcting a target image, according to some embodiments.

FIG. 6 is a block diagram illustrating a process of selection or generation of a lens sub-profile for correcting a target image, according to some embodiments. The process shown in FIG. 6 may, for example, be performed in or by an image processing application, for example Adobe® Photoshop® or Adobe® Camera Raw®, to correct aberrations in an input target image or images 210. The one or more lens profile files 100 (e.g., lens profile 100A, lens profile 100B, lens profile 100C, and lens profile 100D) may, for example, have been previously generated using a lens profiling module 120, as illustrated in FIG. 5. A target image or images 210 may be input or specified for processing. A lens profile file 100B may be determined. To determine the lens profile file 100B, in some embodiments, lens profile file selection module 200 may access image metadata 212 (e.g., EXIF metadata) in image 210 to determine the camera/lens combination used to capture image 210, and select the lens profile file 100B from among the set of one or more lens profile files 100 according to the camera/lens combination specified by image metadata 212. In some embodiments, there may be a match for the lens used to capture image 210, but not for the camera body used to capture image 210; in this case, a lens profile file may be selected that corresponds to the lens but that specifies a different camera body. Alternatively, a user may specify a lens profile file 100B to be used, or the lens profile file 100B to be used may be otherwise determined.

Lens profile file 100B may include metadata 102B specifying one or more camera/lens parameters or properties for the respective camera/body combination and one or more sub-profiles 104B for different settings of the camera/lens combination. Also shown in FIG. 6, lens profile files 100A, 100C, and 100D may include metadata 102A, 102C, and 102D, respectively, and one or more sub-profiles 104A, 104C, and 104D, respectively. In the example presented in FIG. 6, after lens profile file 100B is selected, a sub-profile processing module 202 may select or generate a sub-profile 104B1 to be applied to target image(s) 210 to correct aberrations in image data 214, and may retarget the lens profile file to the target image. Sub-profile processing module 202 may access image metadata 212 in a target image 210 to determine one or more camera/lens settings (e.g., focal length, focus distance, and aperture settings) that were used capture the image 210. Sub-profile processing module 202 may attempt to locate a sub-profile 104B in lens profile file 100B that was generated according to the same setting(s). If a sub-profile 104B is found that matches the settings used to capture image 210, then that sub-profile (e.g., sub-profile 104B1) may be provided to an image correction module 204 to be applied to image data 214 to correct aberrations and output corrected image 220. If a sub-profile 104B is not found that matches the settings used to capture image 210, then sub-profile processing module 202 may generate an interpolated sub-profile 104B1, as described below, and the interpolated sub-profile 104B1 may be provided to the image correction module 204 to be applied to image data 214 to correct aberrations and output corrected image 220.

Sub-Profile Processing

Figure 7:
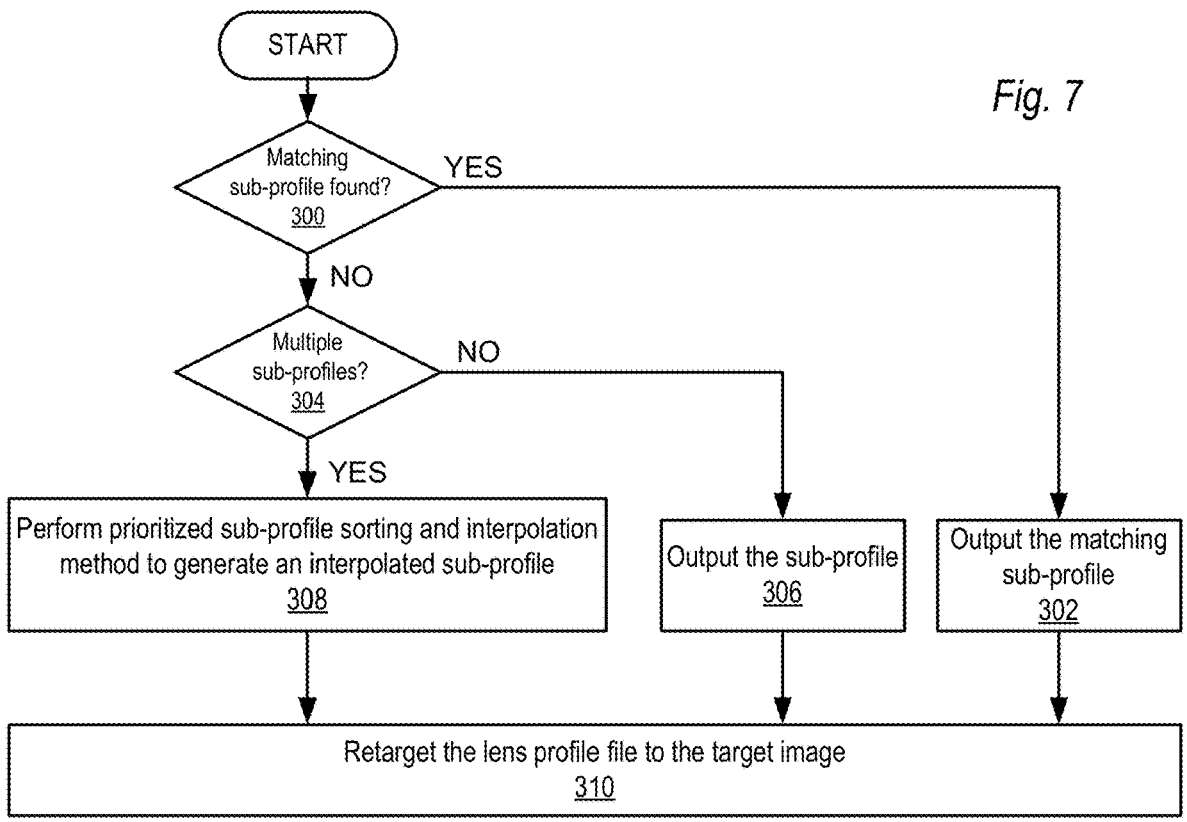
FIG. 7 is a high-level flowchart of a method for processing sub-profiles in a lens profile file, according to some embodiments.
Figure 9:
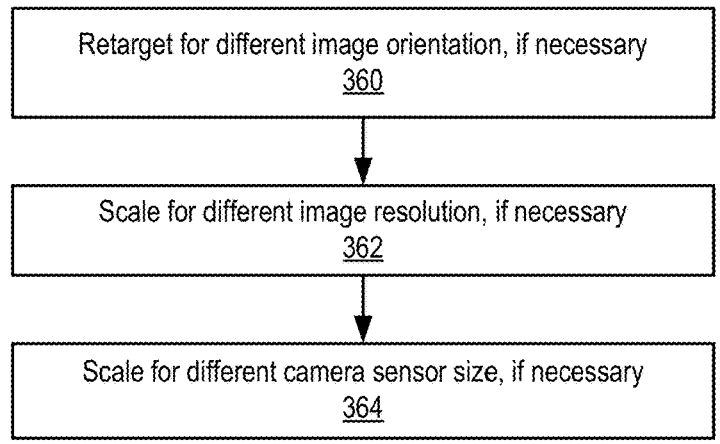
FIG. 9 illustrates a method for retargeting a lens profile file for a target image, according to some embodiments.
Figure 10:
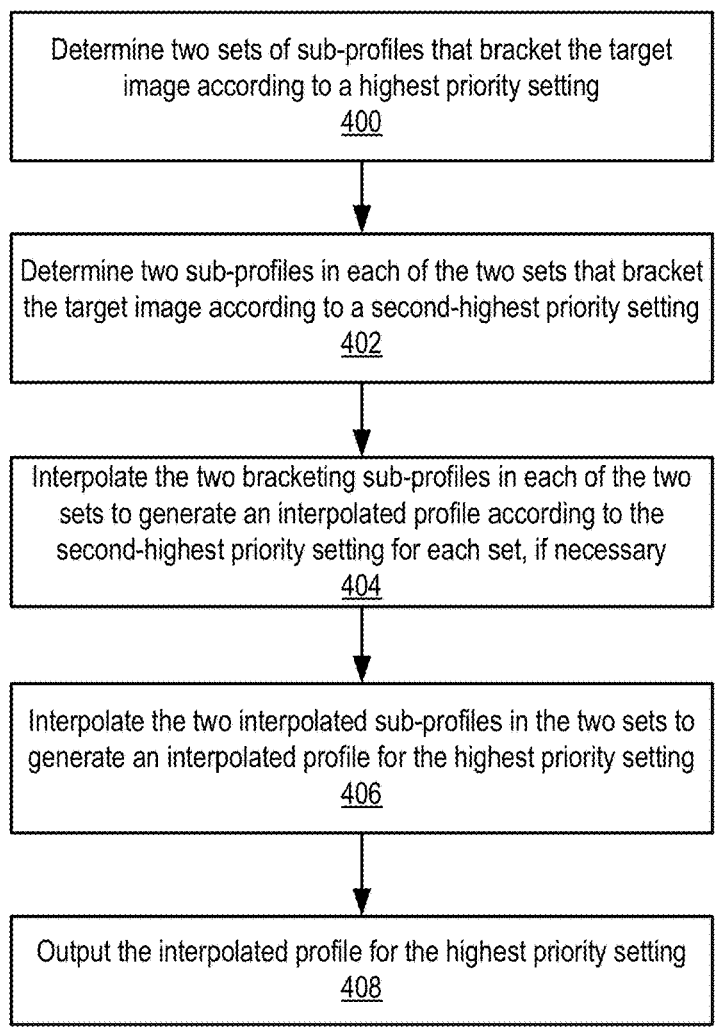
FIG. 10 illustrates a general method for prioritized sub-profile sorting and interpolation, according to some embodiments.

FIG. 7 is a high-level flowchart of a method for processing sub-profiles in a lens profile file, according to some embodiments. The method may be implemented in a sub-profile processing module, for example sub-profile processing module 202 of FIG. 6. Some embodiments of the sub-profile processing module may be implemented, for example, as a plug-in for or module in an image processing application, such as Adobe® Photoshop® or Adobe® Camera Raw®. Other embodiments may be otherwise implemented, for example as a stand-alone program or utility, or as a library function. At 300, the method may try to locate a matching sub-profile in the lens profile file, for example by comparing camera parameters or settings including one or more of focal length, focus distance, and aperture in the image metadata to metadata stored in or with the sub-profiles. If a matching sub-profile is found at 300, then the sub-profile may be output, as indicated at 302. At 304, if there is only one sub-profile in the lens profile file, then the sub-profile may be output, as indicated at 306. At 304, if there are two or more sub-profiles in the lens profile file, then, as indicated at 308, the method may perform a prioritized sub-profile sorting and interpolation method to generate an interpolated sub-profile. FIG. 10 illustrates a general prioritized sub-profile sorting and interpolation method that may be used in some embodiments. As indicated at 310, the lens profile file may be retargeted for the target image. A method for retargeting the lens profile file that may be used in some embodiments is shown in FIG. 9.

By performing lens profile retargeting after the prioritized sub-profile sorting and interpolation method, the interpolation is performed in normalized coordinate space rather than in the target image coordinate space. There is only one final interpolated sub-profile that needs to be retargeted.

Figure 8:
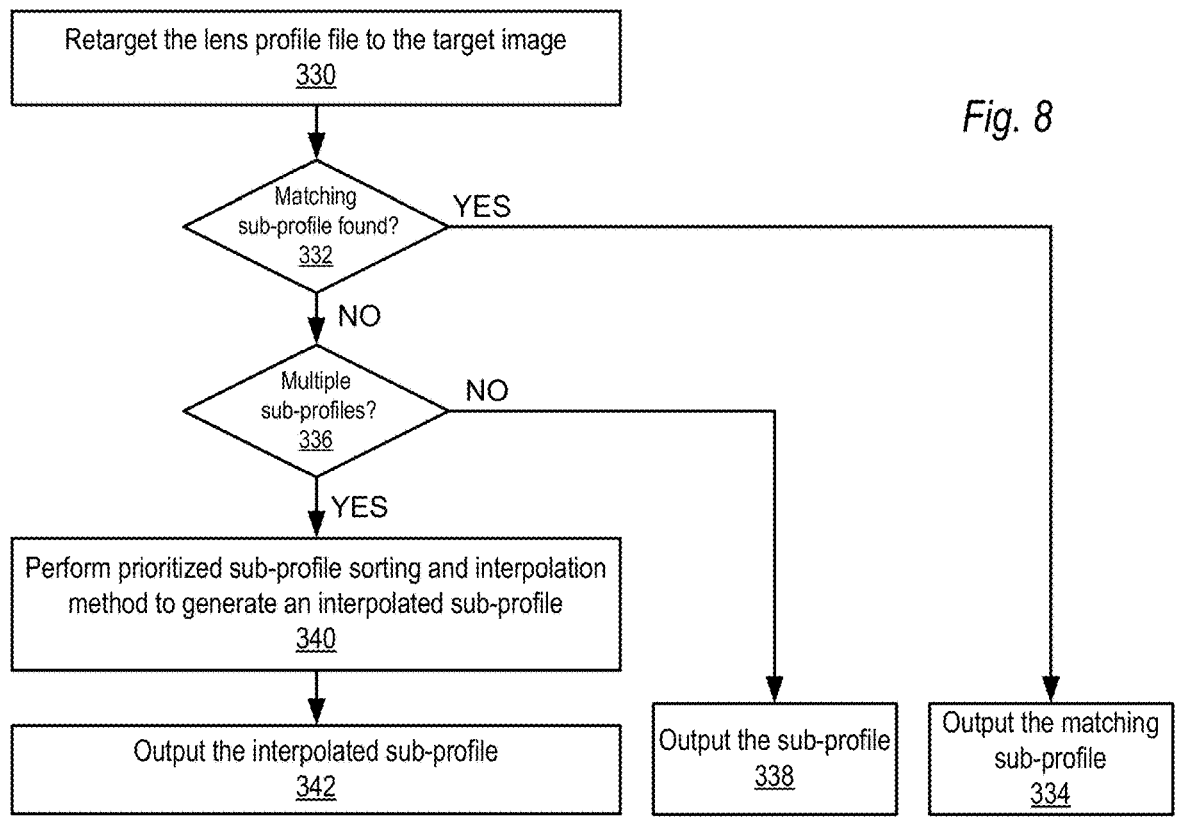
FIG. 8 is a high-level flowchart of an alternative method for processing sub-profiles in a lens profile file, according to some embodiments.

FIG. 8 is a high-level flowchart of an alternative method for processing sub-profiles in a lens profile file, according to some embodiments. In this embodiment, the lens profile file is retargeted before the prioritized sub-profile sorting and interpolation is performed. Other embodiments may be otherwise implemented, for example as a stand-alone program or utility, or as a library function. As indicated at 330, the lens profile file may be retargeted for the target image. A method for retargeting the lens profile file that may be used in some embodiments is shown in FIG. 9. At 332, the method may try to locate a matching sub-profile in the lens profile file, for example by comparing camera parameters or settings including one or more of focal length, focus distance, and aperture in the image metadata to metadata stored in or with the sub-profiles. If a matching sub-profile is found at 332, then the sub-profile may be output, as indicated at 334. At 336, if there is only one sub-profile in the lens profile file, then the sub-profile may be output, as indicated at 338. At 336, if there are two or more sub-profiles in the lens profile file, then, as indicated at 340, the method may perform a prioritized sub-profile sorting and interpolation method to generate an interpolated sub-profile. FIG. 10 illustrates a general prioritized sub-profile sorting and interpolation method that may be used in some embodiments. The interpolated sub-profile may then be output, as illustrated at 342.

By performing lens profile retargeting before the prioritized sub-profile sorting and interpolation method, the interpolation is performed in the target image coordinate space rather than in the normalized coordinate space.

In some embodiments, an interpolated sub-profile may be appended to the lens profile file, or otherwise stored, for future use.

Retargeting a Lens Profile File to the Target Image

A camera model (for example, the camera model described in the section titled Example camera model) may describe the mathematical lens aberration correction models in a normalized coordinate system within the reference camera coordinate system. For example, the camera model may describe the model formulations in terms of an (x,y) normalized coordinate system, normalized according to focal length F, and expressed in terms of pixels. Before a lens sub-profile generated according to the camera model can be used to correct the lens distortion in a target image, the lens sub-profile needs to be scaled properly (retargeted) for the target image. Assuming there is a lens model and lens mount match based on the target image metadata, model retargeting is performed for the target image, for example as illustrated in FIG. 9. The model retargeting aligns the model data in the lens profile file with the target image data, brings both into the same coordinate system, and performs scaling if necessary.

FIG. 9 illustrates a method for retargeting a lens profile file for a target image, according to some embodiments. This method may be performed by a sub-profile processing module, such as module 202 of FIG. 6. As indicated at 360, the lens sub-profiles in the lens profile file may be retargeted for a different image orientation (portrait or landscape mode) if the target image was captured using a different orientation than was used to generate the lens sub-profile. In some embodiments of a camera model, each lens sub-profile may be normalized by the maximum of the reference image width and height. If the target image width and height is not consistent with the reference image width and height in terms of the dominant direction, the axes of the lens sub-profiles may be swapped. This ensures that the x axis in the lens sub-profiles is consistent with the x axis in the target image.

In some embodiments, the lens sub-profile models are expressed according to a pixel coordinate system, and normalization is performed according to the pixel coordinate system. Parameters from the target image may be converted to the pixel coordinate system for normalization. In some embodiments, the focal length used to capture the target image may be obtained from the target image metadata in terms of millimeters (mm). The focal length can be converted from mm to pixels based on the sensor size of the camera; the sensor size may, for example, be derived from the sensor format factor, if available, or may be read directly from the image metadata or otherwise derived or estimated.

As indicated at 362 of FIG. 9, the lens sub-profiles may be scaled to normalize the image resolution, if necessary. This may involve aligning the image centers and normalizing by the maximum of the image width and height in pixels.

As indicated at 364 of FIG. 9, the lens sub-profiles may be scaled for a different camera sensor size, if the sensor size of the camera body with which the target image was captured is different than the sensor size used in estimating the models in the lens sub-profile. The sensor size of the camera body used to capture the target image may, for example, be computed from the sensor format (or crop) factor, which may be read from the metadata of the target image or may otherwise be obtained. Using embodiments, lens sub-profiles generated from or for a larger sensor can be applied to a target image captured with a camera with a smaller sensor and with the same type of lens. In some cases, lens sub-profiles generated from or for a smaller sensor can be applied to a target image captured with a camera with a larger sensor and with the same type of lens.

It may not always be possible to determine a sensor size for a target image. For example, some images may not include a sensor format factor. In some embodiments, if the sensor size of the camera body used to capture a target image cannot be computed or otherwise determined, but there is a camera make and model match to a lens profile file, then the lens profile file may be selected as a compatible lens profile file, and applicable retargeting of the lens profile file may be performed. However, in some embodiments, the lens sub-profiles may not be scaled for a different camera sensor.

Prioritized Sub-Profile Sorting and Interpolation Method

One or more of the camera settings (e.g., focal length, focus distance, and aperture) used to capture a target image may differ from the camera settings used to generate one or more, or all, of the sub-profiles in a lens profile file. Thus, embodiments may provide a method to select or generate a sub-profile that best matches the camera settings used to capture the target image. If an exact match is found, then that sub-profile is used. If an exact match is not found, then a sub-profile may be generated. Generating the sub-profile may involve generating an interpolated aberration correction model for one or more aberrations modeled in the camera model (e.g., a geometric distortion model, a lateral chromatic aberration model, and a vignette model, in some embodiments). However, different camera settings (e.g., focal length, focus distance, and aperture) may have different levels of effect on a particular aberration. For example, for geometric distortion and lateral chromatic aberration, the focal length may be a major factor, the focus distance may be a minor factor, and the aperture may be mostly a non-factor. For vignette, the focal length may be a major factor, the aperture may be a secondary factor, and the focus distance may be a minor factor, or the tertiary factor. Note that other camera settings may also be considered as factors, in some embodiments. Thus, embodiments may provide a method for generating interpolated aberration models from the set of sub-profiles in a lens profile file that considers the priorities of camera settings. The set of interpolated aberration models so generated may be output as a lens sub-profile for the target image.

FIG. 10 illustrates a general method for prioritized sub-profile sorting and interpolation, according to some embodiments. This method may be performed by a sub-profile processing module, such as module 202 of FIG. 6. As indicated at 400, the method may determine two sets of sub-profiles that bracket the target image according to a highest priority setting. In some embodiments, to determine the two sets of sub-profiles, the method may sort the sub-profiles according to the highest priority setting, and select two sets of sub-profiles for which the highest priority setting brackets the setting as specified in the metadata of the target file. Each set may include one or more sub-profiles. If the highest priority setting as specified in the target file is not bracketed by the sub-profiles, then a nearest sub-profile may be selected.

As indicated at 402, the method may determine two sub-profiles in each of the two sets that bracket the target image according to a second-highest priority setting. In some embodiments, to determine the two bracketing sub-profiles, the method may sort the sub-profiles in each set according to the second-highest priority setting, and select two sub-profiles in each set for which the second-highest priority setting brackets the setting as specified in the metadata of the target file. If the second-highest priority setting as specified in the target file is not bracketed by the sub-profiles, then a nearest sub-profile may be selected.

As indicated at 404, the method may interpolate (e.g., using a bilinear interpolation technique) the two bracketing sub-profiles in each of the two sets of sub-profiles to generate an interpolated profile according to the second-highest priority setting for each set. This interpolation is not necessary in a set if a nearest sub-profile was selected because the setting of the target image was not bracketed.

As indicated at 406, the method may interpolate (e.g., using a bilinear interpolation technique) the two interpolated (or selected) sub-profiles in the two sets to generate an interpolated profile for the highest priority setting.

As indicated at 408, the method may output the interpolated profile for the highest priority setting.

FIG. 10 describes the method being performed for two prioritized camera settings (e.g., focal length and focus distance). However, the method can be extended to apply to three (e.g., focal length, focus distance, and aperture) or more prioritized camera settings for one or more of the aberration models being interpolated (e.g., geometric distortion, lateral chromatic aberration, and vignette). For example, for geometric distortion and lateral chromatic aberration model interpolation, the focal length may be the highest priority setting, and the focus distance may be the second highest priority setting. Aperture may be a non-factor; however, lens sub-profiles that are closest to the aperture of the target image may be selected from sets that bracket the target image according to focus distance. As another example, for vignette model interpolation, the focal length may be the highest priority setting, the aperture second highest priority setting, and the focus distance may be the third highest priority setting. For each prioritized setting, the sub-profiles may be sorted and bracketing sets or sub-profiles may be determined.

Figure 11:
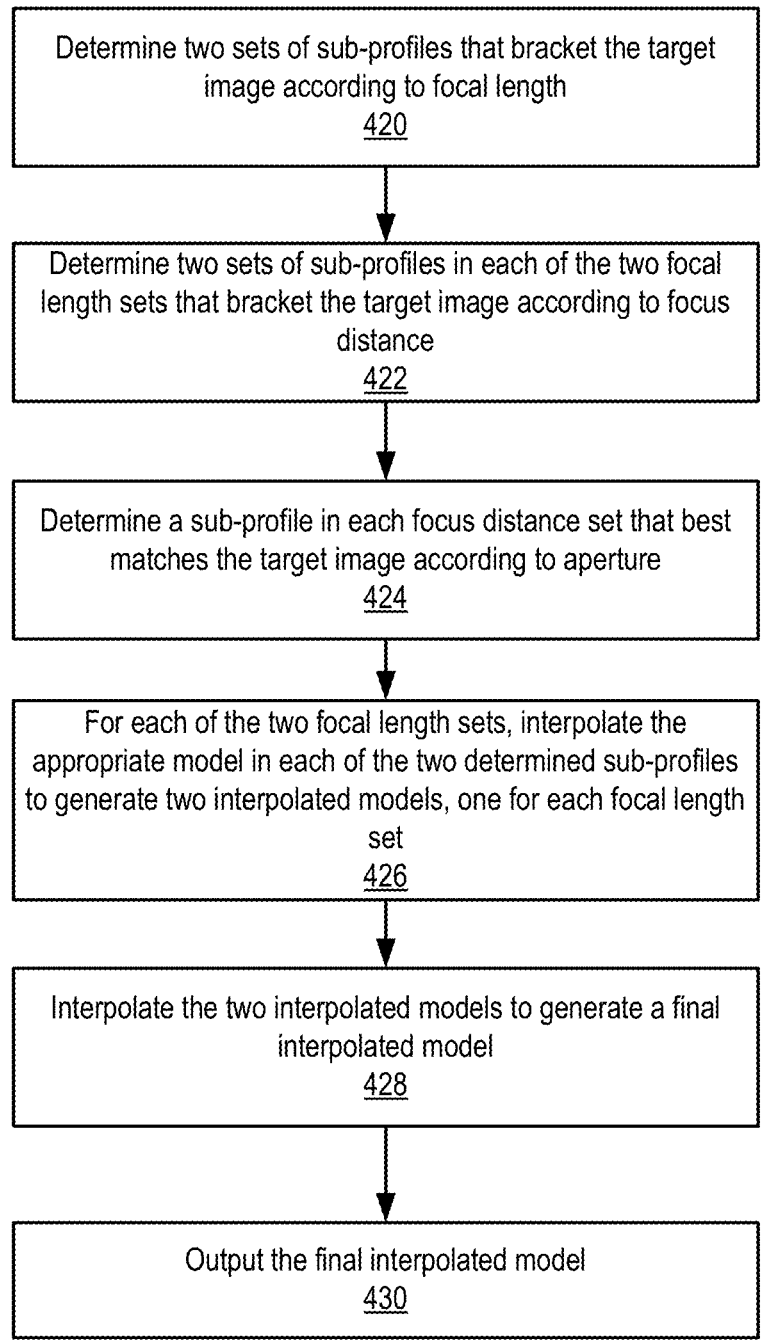
FIG. 11 illustrates a method for prioritized sub-profile sorting and interpolation that may be applied to generate interpolated geometric distortion and/or lateral chromatic aberration models, according to some embodiments.

FIG. 11 illustrates a method for prioritized sub-profile sorting and interpolation that may be applied to generate interpolated geometric distortion and/or lateral chromatic aberration models, according to some embodiments. As indicated at 420, the method may determine two sets of sub-profiles that bracket the target image according to focal length. As indicated at 422, the method may determine two sets of sub-profiles in each of the two focal length sets that bracket the target image according to focus distance. If the target image focus distance is not available, the sets may be generated based on the largest focus distance. As indicated at 424, the method may determine a sub-profile in each focus distance set that best matches the target image according to aperture. If the target image aperture value is not available, a sub-profile that has the largest aperture value may be selected. As indicated at 426, for each of the two focal length sets, the method may interpolate the appropriate model in each of the two determined sub-profiles to generate two interpolated models, one for each focal length set. As indicated at 428, the method may interpolate the two interpolated models to generate a final interpolated model. As indicated at 430, the method may output the final interpolated model.

Figure 12:
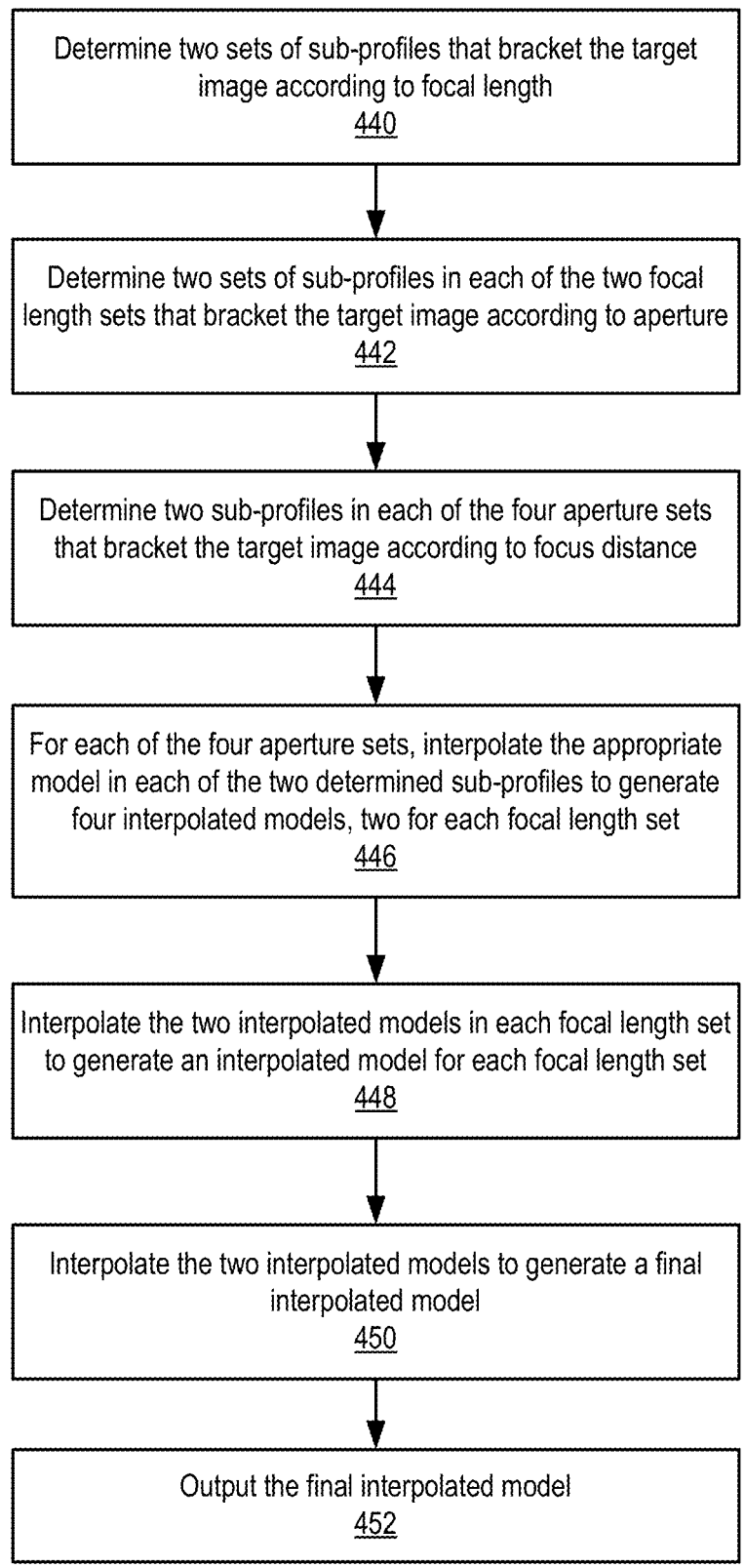
FIG. 12 illustrates a method for prioritized sub-profile sorting and interpolation that may be applied to generate interpolated geometric distortion and/or lateral chromatic aberration models, according to some embodiments.

FIG. 12 illustrates a method for prioritized sub-profile sorting and interpolation that may be applied to generate interpolated geometric distortion and/or lateral chromatic aberration models, according to some embodiments. As indicated at 440, the method may determine two sets of sub-profiles that bracket the target image according to focal length. As indicated at 442, the method may determine two sets of sub-profiles in each of the two focal length sets that bracket the target image according to aperture. If the target image aperture value is not available, a sub-profile that has the largest aperture value may be selected. As indicated at 444, the method may determine two sub-profiles in each of the four aperture sets that bracket the target image according to focus distance. If the target image focus distance is not available, the sub-profiles may be selected based on the largest focus distance. As indicated at 446, for each of the four aperture sets, the method may interpolate the appropriate model in each of the two determined sub-profiles to generate four interpolated models, two for each focal length set. As indicated at 448, the method may interpolate the two interpolated models in each focal length set to generate an interpolated model for each focal length set. As indicated at 450, the method may interpolate the two interpolated models to generate a final interpolated model. As indicated at 452, the method may output the final interpolated model.

Example Camera Model

The following describes an example camera model that may be used in some embodiments, and is not intended to be limiting. The example camera model characterizes the most common form of lens aberrations, namely the geometric distortion (both radial and tangential distortions), the lateral chromatic aberration and the radial light falloff from the principal point (the vignetting), for various lens types including, but not limited to, rectilinear, wide-angle, and fisheye lenses. Note that, in some embodiments, other types of aberrations may be characterized in the camera model.

Geometric Distortion Model for Rectilinear Lenses

Figure 13:
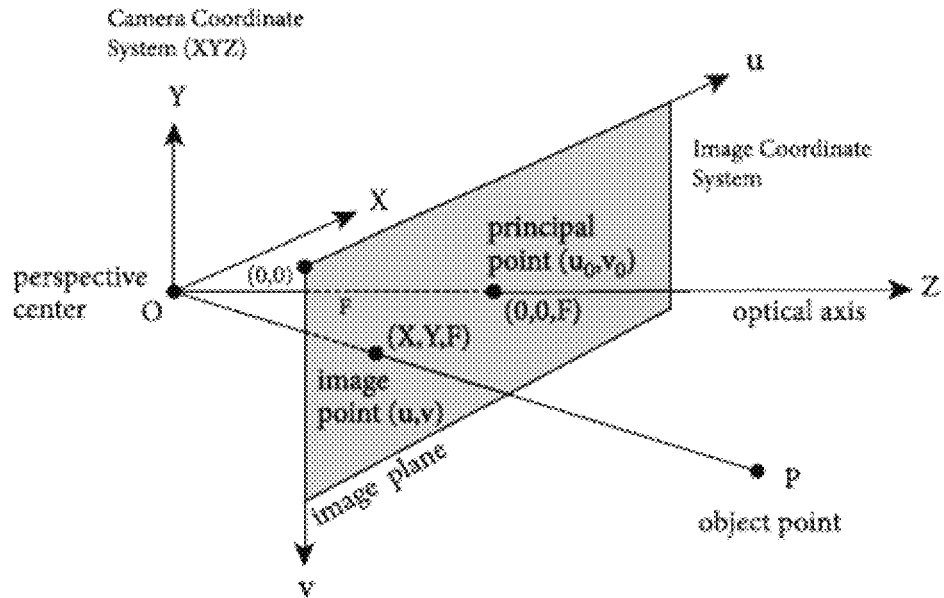
FIG. 13 illustrates an example pinhole camera model.

Before explaining the geometric distortion model for rectilinear lenses, some notations are introduced. FIG. 13 illustrates an example pinhole camera model. The image plane is setup at one focal length F distance away from the camera coordinate system's XY plane. The object point P in the camera coordinate system is projected onto the image plane with the emanating light ray passing through the camera's perspective center O. The resulting image point is referenced as point (u,v) in the image coordinate system, or equivalently as point (X,Y,F) in the camera coordinate system. Typically, the (u,v) coordinates are denoted in the number of pixels, whereas the (X,Y,Z) coordinates are represented in a real world physical unit such as millimeters.

Let F be the focal length in millimeters. Let $s_x$ and $s_y$ denote the width and height of the sensor pixels measured in the number of pixels per millimeter. Let $f_x=s_x F$ and $f_y=s_y F$, which are the focal lengths expressed in the number of X and Y pixels respectively. Note that when the individual pixels on the sensor are not square, the two focal lengths $f_x$ and $f_y$ will be different.

In the pinhole camera model, all points along the ray from the perspective center O towards the object point P share the same image point (X,Y,F). The projective mapping of the object points along a ray may thus be uniquely represented using the homogenous coordinates (x,y,1) of the image point (X,Y,F), where x=X/F, and y=Y/F. The point (x,y) may be considered as the ideal image point location before the lens distortion is introduced. Let $(x_d, y_d)$ be the distorted image point after the lens distortion, which is the actual point observed on the image. The geometric distortion model for the rectilinear lenses can be formulated as follows:

$$\begin{bmatrix} x_d \\ y_d \end{bmatrix} = \begin{bmatrix} (1+k_1r^2+k_2r^4+k_3r^6)x + 2(k_4y+k_5x)x + k_5r^2 \\ (1+k_1r^2+k_2r^4+k_3r^6)y + 2(k_4y+k_5x)y + k_4r^2 \end{bmatrix}$$

where $r^2=x^2+y^2$ and $k_1$, $k_2$, $k_3$ are parameters for the radial distortion and $k_4$, $k_5$ are parameters for the tangential distortion.

Equivalently, the model can also be re-written in the image coordinate system as in the following equations:

$$\begin{bmatrix} x_d \\ y_d \end{bmatrix} = \begin{bmatrix} (u_d-u_0)/f_x \\ (v_d-v_0)/f_y \end{bmatrix} \begin{bmatrix} x \\ y \end{bmatrix} = \begin{bmatrix} (u-u_0)/f_x \\ (v-v_0)/f_y \end{bmatrix}$$

$$\begin{bmatrix} u_d \\ v_d \end{bmatrix} = \begin{bmatrix} u + f_x[(k_1r^2+k_2r^4+k_3r^6)x + 2(k_4y+k_5x)x + k_5r^2] \\ v + f_x[(k_1r^2+k_2r^4+k_3r^6)y + 2(k_4y+k_5x)y + k_4r^2] \end{bmatrix}$$

As part of the rectilinear lens model calibration process, $\{u_0, v_0, f_x, f_y, k_1, k_2, k_3, k_4, k_5\}$ are the set of model parameters that need to be estimated, in some embodiments.

Geometric Distortion Model for Fisheye Lenses

FIG. 14 illustrates an example camera model for a fisheye lens. The image plane is set up at one focal length F distance away from the camera coordinate system's XY plane. The object point P in the camera coordinate system is projected onto the image plane with the light ray passing through the camera's perspective center O. The incident angle of the incoming ray with the Z-axis is denoted as $\theta$. In the pinhole camera case, the ideal image point would be at (u,v) in the image coordinate system. However, because of the radial distortion of the fisheye lens, the distorted image point is actually observed at $(u_d, v_d)$. Let r and $r_d$ be the respective radial distances of the ideal and the distorted image points to the principal point, in the camera coordinate system. The fisheye geometric distortion model can then be formulated as follows:

$$r_d = f(\theta + k_1\theta^3 + k_2\theta^5)$$

where $\theta=\arctan(r/f)$ and $k_1$, $k_2$ are fisheye camera model parameters. It is possible to include higher order polynomial terms as part of the approximation. An approximation up to the 5th order term for $\theta$ may be accurate enough for most applications.

Equivalently, the model can also be re-written in the image coordinate system as in the following equation:

$$\begin{bmatrix} u_d \\ v_d \end{bmatrix} = \frac{1}{r}(\theta + k_1\theta^3 + k_2\theta^5)\begin{bmatrix} f_x \cdot \Delta u \\ f_y \cdot \Delta v \end{bmatrix} + \begin{bmatrix} u_0 \\ v_0 \end{bmatrix}$$

where $$\begin{bmatrix} \Delta u \\ \Delta v \end{bmatrix} = \begin{bmatrix} u-u_0 \\ v-v_0 \end{bmatrix}, \theta = \arctan, r = \sqrt{\Delta u^2 + \Delta v^2}, \text{ and } f = \sqrt{f_x f_y}$$

The formulation assumes re-sampling the output corrected image with a uniform square pixel size s=f/F.

As part of the fisheye lens model calibration process, $\{u_0, v_0, f_x, f_y, k_1, k_2\}$ are the set of model parameters that need to be estimated, in some embodiments.

Lateral Chromatic Aberration Model

In color photography, the chromatic aberration describes the phenomenon of a lens failing to focus all colors of an object point to the same point on the image plane. It occurs because lenses have different refractive indices for different wavelengths of light, giving the appearance of color "fringes" of along object boundaries.

Chromatic aberration can be both longitudinal, in that different wavelengths are focused at a different distance along the optical axis, causing different levels of blurring for different colors; and lateral, in that different wavelengths are magnified differently within the image plane that is perpendicular to the optical axis. The problem of chromatic aberration becomes more visible as the digital camera sensor becomes higher resolution.

Without the loss of generality, a lateral chromatic aberration model may be described in the context of three-color RGB image sensors. The model can easily be extended to other multi-color image sensors.

The lateral chromatic aberration model for RGB image sensors may contain three parts. First, there is description of the geometric distortion model for a reference color channel. In this case, the Green color channel may be chosen as the reference color channel. This geometric distortion model can take on the form of the geometric model for the rectilinear lens or the fisheye lens, depending on the type of lens used. There are descriptions of two differential geometric distortion models for both the Red and the Blue color channels relative to the Green reference color channel. The differential geometric model takes into account the additional parameters for scaling, radial and tangential distortions.

Let $(x_d, y_d)$, $(x_d^R, y_d^R)$, and $(x_d^B, y_d^B)$ denote the respective coordinates of the distorted image points in the Green, Red and Blue color channels for the same object point P. The differential geometric distortion models may therefore be formulated as follows:

$$\begin{bmatrix} x_d^R \\ y_d^R \end{bmatrix} = \alpha_0 \begin{bmatrix} (1+\alpha_1 r_d^2+\alpha_2 r_d^4+\alpha_3 r_d^6)x_d + 2(\alpha_4 y_d+\alpha_5 x_d)x_d + \alpha_5 r_d^2 \\ (1+\alpha_1 r_d^2+\alpha_2 r_d^4+\alpha_3 r_d^6)y_d + 2(\alpha_4 y_d+\alpha_5 x_d)y_d + \alpha_4 r_d^2 \end{bmatrix}$$

$$\begin{bmatrix} x_d^B \\ y_d^B \end{bmatrix} = \beta_0 \begin{bmatrix} (1+\beta_1 r_d^2+\beta_2 r_d^4+\beta_3 r_d^6)x_d + 2(\beta_4 y_d+\beta_5 x_d)x_d + \beta_5 r_d^2 \\ (1+\beta_1 r_d^2+\beta_2 r_d^4+\beta_3 r_d^6)y_d + 2(\beta_4 y_d+\beta_5 x_d)y_d + \beta_4 r_d^2 \end{bmatrix}$$

where $r_d^2 = x_d^2 + y_d^2$. The $\alpha_0, \alpha_1, \alpha_2, \alpha_3, \alpha_4, \alpha_5$ are differential model parameters for the Red-Green color shift. The $\beta_0, \beta_1, \beta_2, \beta_3, \beta_4, \beta_5$ are differential model parameters for the Blue-Green color shift.

Equivalently, the differential models can also be rewritten in the image coordinate system as in the following equations:

$$\begin{bmatrix} u_d^R \\ v_d^R \end{bmatrix} = \begin{bmatrix} f_x \cdot x_d^R + u_0 \\ f_y \cdot y_d^R + v_0 \end{bmatrix}$$

$$\begin{bmatrix} u_d^B \\ v_d^B \end{bmatrix} = \begin{bmatrix} f_x \cdot x_d^B + u_0 \\ f_y \cdot y_d^B + v_0 \end{bmatrix}$$

As part of the lateral chromatic aberration model calibration process, the geometric distortion model for the Green reference color channel may need to be estimated, in some embodiments. In addition, the two sets of Red/Green and Blue/Green differential model parameters $\alpha_0, \alpha_1, \alpha_2, \alpha_3, \alpha_4, \alpha_5$ and $\beta_0, \beta_1, \beta_2, \beta_3, \beta_4, \beta_5$ also may be estimated.

Vignette Model

The vignette model characterizes the radial falloff of the sensor response from the principal point. Let $I(x_d, y_d)$ and $I_{ideal}(x_d, y_d)$ be the observed and the ideal (or vignette corrected) raw sensor values at the distorted image point. The raw sensor values are assumed to be linearly proportional to the radiance incident upon the image point, i.e. assuming a linear camera sensor response curve. The vignette function may be expressed as a polynomial radial loss function:

$$L(x_d, y_d) = 1 + \alpha_1 r_d^2 + \alpha_2 r_d^4 + \alpha_3 r_d^6$$

$$I(x_d, y_d) = I_{ideal}(x_d, y_d) \cdot L(x_d, y_d)$$

where:

$$r_d^2 = x_d^2 + y_d^2$$

and:

$$\begin{bmatrix} x_d \\ y_d \end{bmatrix} = \begin{bmatrix} (u_d - u_0)/f_x \\ (v_d - v_0)/f_y \end{bmatrix}$$

Equivalently, the vignette function can be approximated as a polynomial radial gain function, which might be more preferable in the numeric computation for the vignette correction, because it avoids possible division by zero problems:

$$G(x_d, y_d) \approx 1 - \alpha_1 r_d^2 + (\alpha_1^2 - \alpha_2) r_d^4 - (\alpha_1^3 - 2\alpha_1\alpha_2 + \alpha_3) r_d^6 + (\alpha_1^4 + \alpha_2^2 + 2\alpha_1\alpha_3 + 3\alpha_1^2\alpha_2) r_d^8 I_{ideal}(x_d, y_d) = I(x_d, y_d) \cdot G(x_d, y_d)$$

As part of the vignette model calibration process, $\{u_0, v_0, f_x, f_y, \alpha_1, \alpha_2, \alpha_3\}$ are the set of model parameters that need to be estimated, in some embodiments. In some embodiments, these model parameters are identical for all color channels.

Example Lens Profile File Format

An example lens profile file format is described that may contain the camera model description for a specific camera body and lens combination, and that may be used in some embodiments. The lens profile may be read by image processing applications to direct the applications in applying the lens correction models to an input image.

In some embodiments, lens profile files may be encoded in a standard format, such as the standard Adobe® Extensible Metadata Platform (XMP) file format. This XML based file format can be read/written using Adobe's open-sourced XMPCore® Toolkit technology. In other embodiments, lens profile files may be encoded in other standard formats, or in non-standard or custom formats.

A lens profile file may be designed to be a general container for a list of lens sub-profiles. However, some applications may require that all sub-profiles in a lens profile file must be for the same camera body and lens model combination. In some embodiments, a lens profiling module or application that generates the lens profile may ensure that all sub-profiles in a lens profile file are generated from the same type of source image file format (e.g., DNG, JPEG), in the same color mode (e.g., RGB or grayscale), with the same image pixel bit depths, and with the same camera model type (rectilinear or fisheye lens model). Other camera settings such as focal length, aperture and focus distance may change from one sub-profile to another in a lens profile file. The additional file format constraints may simplify the interpolation of the lens profile among the multiple sub-profiles within a lens profile file for new, previously un-observed camera settings. In some embodiments, the lens profile file format does not dictate how the interpolation should be done; this is left up to the lens correction program.

In some embodiments, each sub-profile has a metadata descriptor and one or more descriptors that define the geometric distortion, the lateral chromatic aberration and the vignette models. In some embodiments, all three model descriptors are not required to be present; a minimum of one model descriptor may be required, however. The following sections describe example contents for each part.

Profile Metadata Descriptors

The following is an example list of metadata descriptors, according to some embodiments. The lens profile metadata descriptors may, for example, be used in automatic lens profile matching and to aid user selection. The property name and a brief description is given for each property. Some or all of these properties may be required; others may be optional. In some embodiments, some or all of these properties may be populated from the metadata (e.g., EXIF/XMP metadata) of the set of calibration images (also called the reference image set) that are used to create the lens profiles.

stCamera:Author—Creator credit information.
stCamera:Make—Camera make. EXIF Make tag value.
stCamera:Model—Camera model. EXIF Model tag value.
stCamera:UniqueCameraModel—Unique locale independent camera model. DNG UniqueCameraModel tag value.
stCamera:CameraPrettyName—Display name for the camera body as specified by the profile creator.
stCamera:Lens—Lens model information. DNG Lens tag value.
stCamera:LensInfo—Lens information that describes the min/max focal lengths and f-numbers. DNG LensInfo tag value.
stCamera:LensID—Lens ID information. DNG LensID tag value.
stCamera:LensPrettyName—Display name for the lens as specified by the profile creator.
stCamera:ImageWidth—Reference image width in number of pixels. EXIF ImageWidth tag value.
stCamera:ImageLength—Reference image height in number of pixels. EXIF ImageLength tag value.
stCamera: Xresolution—Reference image X-resolution in DPI. EXIF XResolution tag value.
stCamera: Yresolution—Reference image Y-resolution in DPI. EXIF YResolution tag value.
stCamera:ApertureValue—Aperture value in the APEX unit. EXIF ApertureValue tag value.

stCamera:CameraRawProfile—True if the profile is created from or for camera raw images. False if the profile is created from JPEG or TIFF images.

stCamera:FocusDistance—Average focus distance in meters of the reference image set.

stCamera:SensorFormatFactor—Sensor format factor of the reference camera. If absent, default to match all camera sensor sizes.

Rectilinear Geometric Distortion Model Descriptors

The following is an example list of rectilinear geometric distortion model descriptors, according to some embodiments. These descriptors define the geometric distortion model parameters for the rectilinear lens. Dmax represents the maximum of the reference image width or height in the number of pixels. The property name and a brief description is given for each property. Some or all of these properties may be required; others may be optional.

stCamera:PerspectiveModel—Element that defines the rectilinear lens geometric distortion model.

stCamera:Version—Model version number.

stCamera:FocalLengthX—$f_x/D_{max}$. If absent, default to stCamera:FocalLength in millimeters. May need to be multiplied by the $D_{max}$ of the target image when applying the model for lens correction.

stCamera:FocalLengthY—$f_y/D_{max}$. If absent, default to stCamera:FocalLength in millimeters. May need to be multiplied by the $D_{max}$ of the target image when applying the model for lens correction.

stCamera:ImageXCenter—$u_0/D_{max}$. If absent, default to 0.5. May need to be multiplied by the $D_{max}$ of the target image when applying the model for lens correction.

stCamera:ImageYCenter—$v_0/D_{max}$. If absent, default to 0.5. May need to be multiplied by the $D_{max}$ of the target image when applying the model for lens correction.

stCamera:ScaleFactor—Scale factor. If absent, default to 1.0.

stCamera:RadialDistortParam1—$k_1$ (required).

stCamera:RadialDistortParam2—$k_2$. Required if $k_3$ is present.

stCamera:RadialDistortParam3—$k_3$.

stCamera:TangentialDistortParam1—$k_4$.

stCamera:TangentialDistortParam2—$k_5$.

stCamera:ResidualMeanError—Expected relative model prediction error per pixel.

stCamera:ResidualStandardDeviation—Expected standard deviation of the relative model prediction error.

Fisheye Geometric Distortion Model Descriptors

The following is an example list of fisheye geometric distortion model descriptors, according to some embodiments. These descriptors define the geometric distortion model parameters for the fisheye lens. Dmax represents the maximum of the reference image width or height in the number of pixels. The property name and a brief description is given for each property. Some or all of these properties may be required; others may be optional.

stCamera:FisheyeModel—Element that defines the fisheye lens geometric distortion model.

stCamera:Version—Model version number.

stCamera:FocalLengthX–$f_x/D_{max}$. If absent, default to stCamera:FocalLength in millimeters. Need to be multiplied by the $D_{max}$ of the target image when applying the model for lens correction.

stCamera:FocalLengthY—$f_y/D_{max}$. If absent, default to stCamera:FocalLength in millimeters. Need to be multiplied by the $D_{max}$ of the target image when applying the model for lens correction.

stCamera:ImageXCenter—$u_0/D_{max}$. If absent, default to 0.5. Need to be multiplied by the $D_{max}$ of the target image when applying the model for lens correction.

stCamera:ImageYCenter—$v_0/D_{max}$. If absent, default to 0.5. Need to be multiplied by the $D_{max}$ of the target image when applying the model for lens correction.

stCamera:RadialDistortParam1—$k_1$. (Required).

stCamera:RadialDistortParam2—$k_2$.

stCamera:ResidualMeanError—Expected relative model prediction error per pixel.

stCamera:ResidualStandardDeviation—Expected standard deviation of the relative model prediction error.

Lateral Chromatic Aberration Model Descriptors

The following is an example list of lateral chromatic aberration model descriptors, according to some embodiments. These descriptors define the three components of the lateral chromatic aberration model for RGB color images. The property name and a brief description is given for each property. Some or all of these properties may be required; others may be optional.

stCamera:ChromaticGreenModel—Element that defines the geometric distortion model of the reference Green color channel. The definition could be either for the rectilinear or for the fisheye lens.

stCamera:ChromaticRedGreenModel—Element that defines the differential geometric distortion model that characterize the Red/Green color fringe. It shares the same set of descriptors as the rectilinear geometric distortion model, but the stCamera:ScaleFactor property ($\alpha_0$) is required.

stCamera:ChromaticBlueGreenModel—Element that defines the differential geometric distortion model that characterize the Blue/Green color fringe. It shares the same set of descriptors as the rectilinear geometric distortion model, but the stCamera:ScaleFactor property ($\beta_0$) is required.

Vignette Model Descriptors

The following is an example list of vignette model descriptors, according to some embodiments. These descriptors define the vignette model parameters. Let Dmax be the maximum of the reference image width or height in the number of pixels. The property name and a brief description is given for each property. Some or all of these properties may be required; others may be optional.

stCamera:FocalLengthX—$f_x/D_{max}$. If absent, default to stCamera:FocalLength in millimeters. Need to be multiplied by the $D_{max}$ of the target image when applying the model for lens correction.

stCamera:FocalLengthY—$f_y/D_{max}$. If absent, default to stCamera:FocalLength in millimeters. Need to be multiplied by the $D_{max}$ of the target image when applying the model for lens correction.

stCamera:ImageXCenter—$u_0/D_{max}$. If absent, default to 0.5. Need to be multiplied by the $D_{max}$ of the target image when applying the model for lens correction.

stCamera:ImageYCenter—$v_0/D_{max}$. If absent, default to 0.5. Need to be multiplied by the $D_{max}$ of the target image when applying the model for lens correction.

stCamera:VignetteModelParam1—$\alpha_1$.

stCamera:VignetteModelParam2—$\alpha_2$. Required if $\alpha_3$ is present.

stCamera:VignetteModelParam3—$\alpha_3$.

stCamera:ResidualMeanError—Expected percentage model prediction error.

Example System

Figure 15:
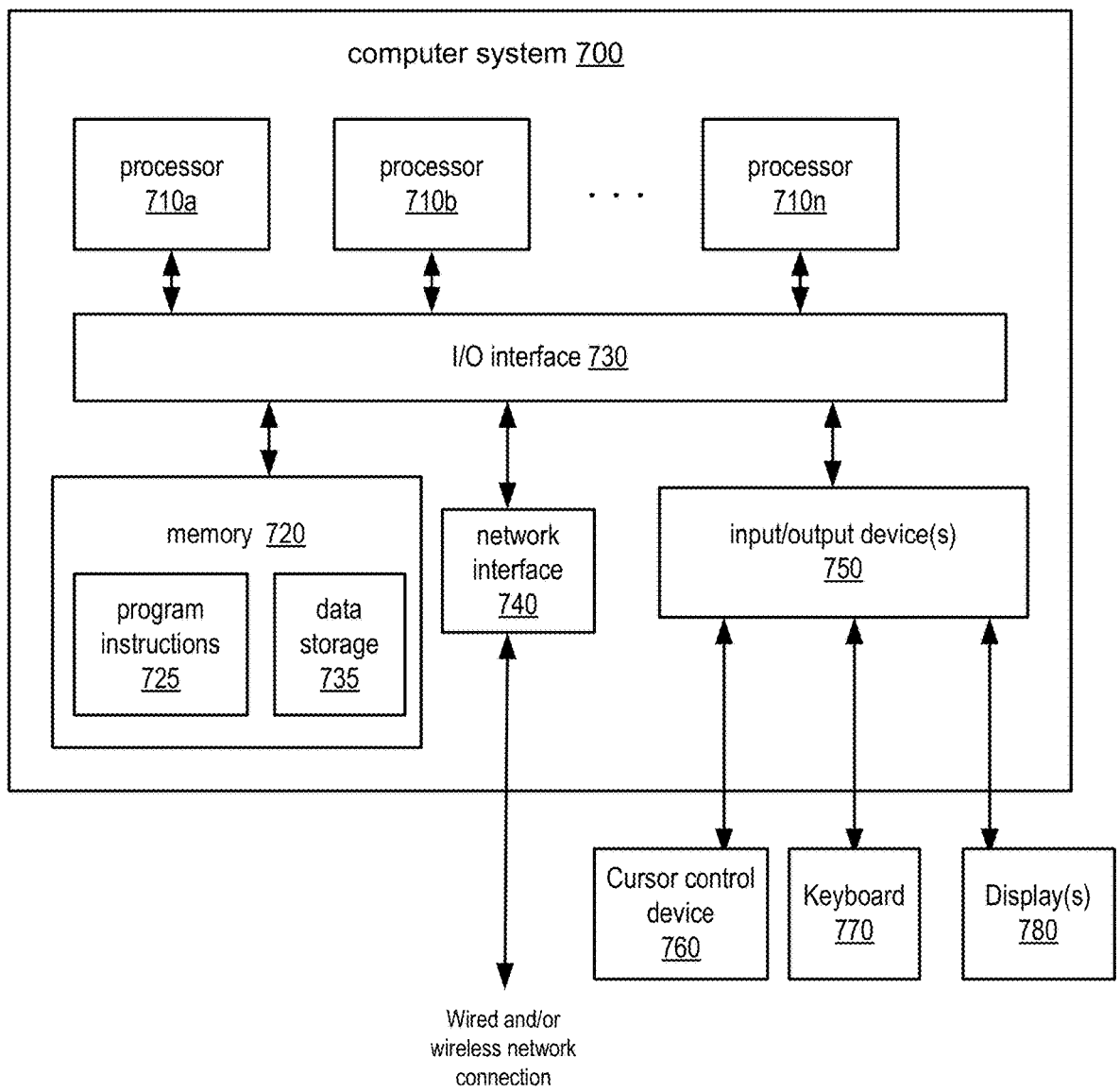
FIG. 15 illustrates an example computer system that may be used in embodiments.

Various components of embodiments of the methods for retargeting and prioritized interpolation of lens profiles as described herein may be executed on one or more computer systems, which may interact with various other devices. One such computer system is illustrated by FIG. 15. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in some embodiments, some elements may be implemented via one or more nodes of computer system 700 that are distinct from those nodes implementing other elements. In some embodiments, computer system 700 may be a digital camera.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for general geometric distortion removal may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for methods for retargeting and prioritized interpolation of lens profiles, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In some embodiments, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 15, memory 720 may include program instructions 725, configured to implement embodiments of methods for retargeting and prioritized interpolation of lens profiles as described herein, and data storage 735, comprising various data accessible by program instructions 725. In some embodiments, program instructions 725 may include software elements of methods for retargeting and prioritized interpolation of lens profiles as illustrated in the above Figures. Data storage 735 may include data that may be used in embodiments. In other embodiments, other or different software elements and data may be included.

Those skilled in the art will appreciate that computer system 700 is merely illustrative and is not intended to limit the scope of the methods for retargeting and prioritized interpolation of lens profiles as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method comprising:
   obtaining a target image, the target image including image data captured by an image sensor of a camera and image metadata including parameters that describe image shooting conditions associated with the capture of the image data;
   responsive to obtaining the target image, obtaining a lens profile file for a camera/lens combination, the lens profile file including a set of sub-profiles associated with different aberrations of the camera/lens combination, each of the sub-profiles including:
      a mathematical model for correcting a respective aberration of the different aberrations; and
      sub-profile metadata specifying one or more camera settings;
   prioritizing the image shooting conditions based on a particular aberration of the different aberrations to correct in the target image;
   comparing the parameters to the one or more camera settings specified in the sub-profile metadata of each sub-profile;
   determining, based on the comparing, that the sub-profiles do not include any matching sub-profiles, a matching sub-profile having sub-profile metadata that specifies one or more camera settings which match the shooting conditions described by the parameters;
   locating two of the sub-profiles having the camera settings that best match the image shooting conditions described by at least one of the parameters included in the image metadata, including describing a highest-priority image shooting condition according to the prioritizing;
   generating an interpolated mathematical model for correcting the particular aberration by interpolating a first mathematical model of a first of the two sub-profiles with a second mathematical model of a second of the two sub-profiles; and
   responsive to the generating, correcting the particular aberration in the target image by applying the interpolated mathematical model to the target image.

2. The computer-implemented method as recited in claim 1, further comprising updating the lens profile file to include a new sub-profile that includes the interpolated mathematical model.

3. The computer-implemented method as recited in claim 1, further comprising retargeting the lens profile file based on at least one of the parameters of the target image, the retargeting including:
   comparing orientation of the target image to orientation of mathematical models in the lens profile file;
   determining that the orientation of the target image is different than the orientation of the mathematical models in the lens profile file based on comparing the orientations; and
   responsive to the determining, changing the orientation of the mathematical models to match the orientation of the target image.

4. The computer-implemented method as recited in claim 1, further comprising retargeting the lens profile file based on at least one of the parameters of the target image, the retargeting including:
   comparing image resolution of the target image to image resolution of mathematical models in the lens profile file;

determining that the image resolution of the target image is different than the image resolution of the mathematical models in the lens profile file based on comparing the image resolutions; and responsive to the determining, scaling the mathematical models in the lens profile file to normalize the image resolution.

5. The computer-implemented method as recited in claim 1, further comprising retargeting the lens profile file based on at least one of the parameters of the target image, the retargeting including:

comparing sensor size of the image sensor to sensor size of mathematical models in the lens profile file;

determining that the sensor size of the image sensor is different than the sensor size of the mathematical models in the lens profile file based on comparing the sensor sizes; and responsive to the determining, scaling the mathematical models in the lens profile file to the sensor size of the image sensor.

6. The computer-implemented method as recited in claim 1, wherein the two sub-profiles have values for the highest-priority shooting condition that bracket a corresponding parameter value included in the image metadata.

7. The computer-implemented method as recited in claim 1, wherein:

the different aberrations include geometric distortion, lateral chromatic aberration, and vignette; and each sub-profile includes a geometric distortion mathematical model, a lateral chromatic aberration mathematical model, or a vignette mathematical model.

8. The computer-implemented method as recited in claim 1, wherein the different aberrations include geometric distortion and lateral chromatic aberration and the sub-profile metadata of each sub-profile specifies camera settings for sub-profile focal length and sub-profile focus distance.

9. The computer-implemented method as recited in claim 1, wherein:

the different aberrations include vignette;

the image shooting conditions include focal length, aperture, and focus distance; and a determination regarding the best match is based on a priority associated with the focal length, the aperture, and the focus distance, from highest to lowest priority.

10. The computer-implemented method as recited in claim 1, further comprising locating the two sub-profiles having the camera settings that best match the shooting conditions described by at least two of the parameters included in the image metadata, the at least two parameters describing the highest-priority image shooting condition and a second highest-priority image shooting condition according to the prioritizing.

11. The computer-implemented method as recited in claim 1, wherein the image shooting conditions include a target image focal length, target image focus distance, target image aperture, and target image sensor format factor.

12. A computer-readable storage medium, excluding signals per se, storing program instructions, wherein the program instructions are computer-executable to perform operations comprising:

receiving, by an image processing application, input specifying to correct aberrations in a target image;

selecting, by the image processing application, a lens profile file according to a camera/lens combination, the lens profile file including a set of sub-profiles, each of the sub-profiles including a mathematical model for correcting a respective aberration of different aberrations associated with particular camera settings of the camera/lens combination and metadata specifying the particular camera settings;

obtaining, by the image processing application, parameters from image metadata included with the target image, the parameters describing camera settings associated with capture of image data of the target image;

comparing, by the image processing application, the parameters to the particular camera settings of each of the sub-profiles; and according to the comparing:

if the obtained parameters match the particular camera settings of at least one of the sub-profiles, correcting, by the image processing application, the different aberrations in the target image according to the mathematical model included with the matching sub-profiles; or if the obtained parameters do not match the particular camera settings of at least one of the sub-profiles, correcting, by the image processing application, the different aberrations in the target image, in part, by:

selecting a particular aberration of the different aberrations to correct in the target image;

determining priorities of the camera settings described by the parameters based on the particular aberration;

locating two of the sub-profiles having the particular camera settings that bracket a parameter from the image metadata corresponding to a highest-priority camera setting according to the determined priorities; and generating an interpolated sub-profile from the two sub-profiles.

13. The computer-readable storage medium as recited in claim 12, wherein the priorities of the camera settings are different for at least two of the different aberrations.

14. The computer-readable storage medium as recited in claim 12, wherein the different aberrations include at least one of geometric distortion or lateral chromatic aberration.

15. A system, comprising:

one or more processors; and memory, communicatively coupled to the one or more processors, a lens profiling module of an image processing application stored in the memory and executable by the one or more processors to perform operations comprising:

identifying an aberration in a captured image that was captured by an image sensor of a camera;

obtaining image metadata of the captured image to compare with sub-profile metadata included in a lens profile file, the image metadata having been included with the captured image as part of generating the captured image and the sub-profile metadata having been included with the lens profile file as part of generating a set of sub-profiles for the lens profile file, the image metadata describing image shooting conditions associated with capture of the captured image, the image shooting conditions including a captured-image focal length, a captured-image focus distance, a captured-image aperture, and a captured-image sensor format factor, the sub-profile metadata specifying one or more camera settings representative of a combination of different image shooting conditions of a captured image that can change when capturing images;

prioritizing the image shooting conditions based on the identified aberration;

determining that the sub-profiles do not include any matching sub-profiles having sub-profile metadata specifying camera setting that match the image shooting conditions, the determining based on a comparison of the image metadata of the captured image to the sub-profile metadata;

selecting at least two mathematical models from a plurality of mathematical models included in the lens profile file, the at least two mathematical models being selected based, at least in part, on the comparison to identify sub-profiles with the sub-profile metadata that best matches a highest-priority shooting condition according to the prioritizing;

generating an interpolated mathematical model for correcting the identified aberration in the captured image by interpolating the at least two mathematical models;

correcting the identified aberration in the captured image by applying the interpolated mathematical model to the captured image.

16. The system of claim 15, wherein the identified sub-profiles include the sub-profile metadata that matches a highest-priority image shooting condition.

17. The system of claim 15, wherein the operations further comprise presenting a user interface and receiving input via the presented user interface to initiate aberration correction in the captured image.

18. The system of claim 15, wherein the operations further comprise generating a new sub-profile for the lens profile file to include the interpolated mathematical model.

19. The system of claim 15, wherein the lens profiling module is implemented as a plug-in for, or a module in, the image processing application.

20. The computer-readable storage medium as recited in claim 12, wherein the operations further comprise, prior to generating the interpolated sub-profile:

interpolating data associated with the two sub-profiles, wherein generating the interpolated sub-profile is further based, at least in part, on the interpolating.

* * * * *